(12) United States Patent
Klein et al.

(10) Patent No.: US 8,388,262 B2
(45) Date of Patent: Mar. 5, 2013

(54) OPERATOR WORKPLACE OF A CONSTRUCTION MACHINE

(75) Inventors: Thomas Klein, Wehr (DE); Thomas Haubrich, Goedenroth (DE)

(73) Assignee: BOMAG GmbH, Boppard (DE)

( * ) Notice: Subject to any disclaimer, the term of this patent is extended or adjusted under 35 U.S.C. 154(b) by 19 days.

(21) Appl. No.: 13/047,032

(22) Filed: Mar. 14, 2011

(65) Prior Publication Data

US 2011/0236130 A1 Sep. 29, 2011

(30) Foreign Application Priority Data

Mar. 26, 2010 (DE) .......................... 10 2010 013 041

(51) Int. Cl.
*E01C 19/00* (2006.01)
(52) U.S. Cl. ..................... 404/83; 404/84.05; 180/329
(58) Field of Classification Search ............. 404/83–85, 404/93–96, 118; 180/209, 329–331
See application file for complete search history.

(56) References Cited

U.S. PATENT DOCUMENTS

| | | | | |
|---|---|---|---|---|
| 5,307,612 A | * | 5/1994 | Tomiyama et al. | 56/11.1 |
| 5,517,809 A | * | 5/1996 | Rich | 56/2 |
| 5,947,490 A | * | 9/1999 | Munnoch et al. | 280/32.7 |
| 5,984,031 A | * | 11/1999 | Velke et al. | 180/6.48 |
| 6,059,309 A | * | 5/2000 | Munnoch et al. | 280/652 |
| 6,094,897 A | * | 8/2000 | Velke et al. | 56/14.7 |
| 6,205,753 B1 | * | 3/2001 | Velke et al. | 56/14.7 |
| 6,827,524 B2 | * | 12/2004 | Starry et al. | 404/129 |
| 7,438,318 B2 | * | 10/2008 | Sano | 280/756 |
| 7,458,439 B2 | | 12/2008 | Catton et al. | |
| 7,753,620 B2 | * | 7/2010 | Kotting et al. | 404/94 |
| 2003/0221402 A1 | * | 12/2003 | Velke et al. | 56/17.5 |
| 2007/0228795 A1 | | 10/2007 | Boehme et al. | |

FOREIGN PATENT DOCUMENTS

| | | |
|---|---|---|
| DE | 693 10 397 T2 | 8/1997 |
| DE | 698 03 469 T2 | 9/2002 |
| DE | 10 2006 015 504 A1 | 10/2007 |
| DE | 60 2004 012 744 T2 | 4/2009 |
| EP | 0 555 025 B1 | 5/1997 |
| EP | 1 007 463 B1 | 1/2002 |
| EP | 1 633 595 B1 | 3/2008 |

OTHER PUBLICATIONS

German Patent and Trademark Office, Research Report, Application No. DE 10 2010 013 041.9, filed Mar. 26, 2010, Search completed on Nov. 30, 2010 (4 pages).

* cited by examiner

*Primary Examiner* — Raymond W Addie
(74) *Attorney, Agent, or Firm* — Wood, Herron & Evans, LLP

(57) ABSTRACT

The invention relates to an operator workplace of a construction machine, especially a milling machine for processing a road surface, comprising a seat with a seating surface, an armrest arranged to the side of the seating surface and comprising an arm supporting surface, and at least one control element arranged on the armrest for controlling at least one machine function. The invention further relates to a construction machine with such an operator workplace.

19 Claims, 5 Drawing Sheets

OPERATOR WORKPLACE OF A CONSTRUCTION MACHINE

The present application claims the priority under 35 U.S.C. §119 of German Patent Application No. 10 2010 013 041.9, filed Mar. 26, 2010, the disclosure of which is hereby incorporated herein by reference in its entirety.

FIELD OF THE INVENTION

The invention relates to an operator workplace of a construction machine, especially a milling machine for processing a road surface, and a construction machine, especially a milling machine for processing a road surface, with such an operator workplace.

BACKGROUND OF THE INVENTION

Generic operator workplaces of construction machines, especially for a milling machine for processing of a road surface, usually comprise a seat with a respective seating surface with a planar and substantially horizontal seating surface. Frequently, there is a backrest in order to provide the operator with a comfortable sitting position. An armrest is arranged to the side of the seating surface which comprises a supporting surface for the arm. The relative position of the armrest or the supporting surface for the arm in relation to the seating surface and back surface is chosen in such a way that the operator who sits in the seat can allow the arm to rest on the supporting surface of the armrest in a bent manner. It is obviously also possible to provide one such armrest on each of the two sides of the seating surface. It is further common practice to arrange control elements such as multifunctional control elements, e.g. in the form of a joystick control, for controlling at least one machine function in the armrest. This special embodiment of an operator workplace allows the operator to control the construction machine even over prolonged periods of time in a comfortable and ergonomically positive body posture because he is able to place the arm on the supporting surface of the armrest and at the same time is able to perform control functions on the construction machine with the control element integrated in the armrest. A generic operator workplace is known for example from DE 10 2006 015 504 A1.

Situations frequently occur in the daily operation of a construction machine where limited visibility from the sitting position of the machine operator prevents precise guidance of the machine. This occurs especially frequently in milling machines for processing a road surface where a milling roll needs to be guided as precisely as possible over the road surface to be removed. Many machine operators will change especially in such situations from a seated position to a standing position in order to gain a better view of the working area and/or boundary area to be processed and to thus achieve a more precise guidance of the construction machine over the ground. It is therefore known from DE 10 2006 015 504 A1 to provide the backrest of the seat of the operator workplace to be pivotable towards the driver, so that he can use the upper end of the backrest as a seat in a semi-sitting/standing position. In order to enable the machine operator to securely guide the construction machine both in his sitting position as well as in his leaning seating/standing position, the steering wheel positioned in the working direction of the construction machine in front of the machine operator can be swiveled upwardly about a horizontal pivoting axis between an inclined position to a flatter position and vice versa. Following each change between the sitting position and the standing or sitting/standing position, the operator needs to adjust his arm posture. At the same time, the control of the at least one control element in the armrest is very tiring and ergonomically unfavorable especially in the standing position because there is no supporting feature for the operator's arm that performs the control. In modern road milling machines however an increasing number of functions are integrated as control elements in the armrest arranged to the side of the machine operator and partly there is even no steering wheel, and steering control is also performed via control elements on the armrest. This will often lead to fatigue phenomena in various positions of the operator.

The armrest is usually rigidly arranged on the seat and merely allows a minimal height adjustment for various operators in the respective sitting position, if at all. Conventional adjusting paths lie in the range for example up to a maximum of 10 cm in the vertical direction. If the machine operator changes from his sitting position to the standing position, the position of his arm will change relative to the control element integrated in the armrest. This will frequently be perceived as disadvantageous because the control element functions cannot be operated similarly from the sitting position and the standing position. Moreover, the operation of the control elements integrated in the armrest is especially strenuous for the machine operator in the standing position because the arm is then not able to rest on the armrest and he needs to operate the control elements in an exceptionally uncomfortable inclined position of the arm, especially forearm.

It is therefore the object of the invention to provide an operator workplace which is improved with respect to operating comfort and functionality in comparison with previous operator workplaces of construction machines, especially milling machines for processing a road surface.

SUMMARY OF THE INVENTION

One relevant aspect of the invention is that the operator workplace has an adjusting device which is arranged in a manner that the armrest is adjustably arranged between a sitting operating position and a standing operating position which is positioned upwardly in the vertical direction in comparison with the sitting operating position. In accordance with the invention, this therefore does not concern an armrest which comprises an armrest that is slightly height-adjustable for the operator who is seated. The idea of the invention is rather that the armrest can be adjusted between two positions which are clearly spaced from one another in the vertical direction in order to provide both the seated as well as the standing operator a possibility for support for the operator. The advantageous effect of such an adjusting device is substantially that the position of the arm relative to the supporting surface of the armrest and thus also to the at least one control element arranged in the armrest will not change or is maintained from the sitting operating position to the standing operating position and vice versa. The armrest virtually follows the standing up movement of the operator from the sitting operating position to the standing operating position and in the opposite direction the sitting down movement from the standing operating position to the sitting operating position. This operator workplace in accordance with the invention is characterized on the one hand by an especially high variability since the operator can work in a sitting position in the seat ("sitting operating position") and in a standing position in the operator workplace ("standing operating position"). On the other hand, the operator workplace in accordance with the invention offers the operator an environment that can be operated in an especially secure and reliable manner because the at least one control element arranged on the armrest can be operated both in the sitting operating position as well as in the standing operating position of the armrest with the same position of the arm. Both in the sitting posture of the operator (armrest in sitting operating position) and in the standing posture of the operator (standing operating position) he is thus able to place his arm and especially his forearm in the same manner on the supporting surface of the armrest because the armrest in accordance with the invention with the adjusting device will follow the sitting down and standing up motion. As seen in the vertical direction, the actuating range of the armrest lies especially in the range of between 25 and 60 cm and especially 30 to 50 cm. The sitting operating position thus designates in the present case the positioning of the individual elements of the operator workplace, especially also the armrest, which relate to the operation by the sitting operator. The "standing operating position" designates the position which the individual components of the operator workplace assume during operation by a standing operator.

In order to further increase the variability of the standing operating position over the sitting operating position it is preferable that the adjusting device is arranged in the manner that the armrest in the standing operating position is forwardly offset in relation to the seat in the horizontal direction against the sitting operating position. This embodiment is thus characterized in that the adjusting movement of the armrest between its position in the sitting operating position and in the standing operating position comprises not only an adjusting component in the vertical direction but also a further adjusting component in the horizontal direction. Usually, the sitting position is displaced to the rear (or against the direction of view of the operator) over a standing position. When the operator rises from the seat in order to inspect more closely the working area in front of a milling roll he will move the upper part of his body forwardly and upwardly. This is especially the case when the seat is arranged in a substantially fixed manner. Fixed shall be understood in this connection in such a way that the seat or sitting surface cannot be pivoted away in order to provide space for the standing operating position of the operator. Fixed does not mean on the other hand that the seat is not individually adjustable by a few centimeters with respect to the height and depth the seat in the sitting position.

In the event that the adjusting device performs an adjusting movement of the armrest from the standing operating position to the sitting operating position and vice versa, it is principally possible to construct the adjusting device in such a way that these two sequences of motion run successively. For this embodiment the adjusting device is arranged in the manner for example that the armrest is moved first in the horizontal direction forwardly during a movement from its sitting operating position to a standing operating position and then is moved upwardly in the vertical direction. In an alternative embodiment however the vertical and horizontal adjustments run simultaneously. In this embodiment the adjusting device is therefore arranged in the manner that the adjusting movement between the sitting operating position and the standing operating position occurs in an overlapping with respect to the vertical and horizontal direction, especially simultaneously. In summary, in a vertical plane which is directed forwardly in the direction of view of the operator or relating to the construction machine this results in an inclined movement of the armrest which can be arranged in said vertical plane in a straight line or also curved, especially in a concave curved manner as seen from the operator. The advantage of arranging the adjusting device in the manner that the horizontal and vertical pivoting movement of the armrest can be combined in a common sequence of movements and will thus run simultaneously is due to the fact among other things that in this way a harmonic and constant sequence of movements of the armrest is obtained between the sitting operating position and the standing and vice versa, which sequence of movements is perceived by the user to be especially pleasant.

It is obviously possible to integrate further adjusting possibilities in the adjusting device. This especially relates to an arrangement of the adjusting device in the manner that the armrest is laterally adjustable. "Laterally" relates to an adjusting movement to the side the operator sitting in the seat, which means to the right or to the left. This embodiment especially also allows that the operator can additionally move to the side of the seat during a movement from the sitting operating position to the standing operating position. This is especially relevant in such construction machines in which the precise guidance of at least one of the two sides of the road construction machine as is especially the case in the null side of a road milling machine is especially important. The additional lateral adjustability of the armrest between the sitting operating position and the standing operating position generally increases the versatility of the operator workplace in accordance with the invention.

The seat of the operator workplace can be decoupled completely from the sequence of movement of the adjusting device. If the armrest is moved in this embodiment by means of the adjusting device from the sitting operating position to the standing operating position and vice versa, this has no effect on the positioning of the seat for example. This embodiment especially comprises the aforementioned adjusting device with vertical and horizontal adjusting components in order to compensate by the vertical component the forwardly directed "withdrawal" of the operator from the seat to the standing operating position with the armrest.

It is alternatively also possible to arrange the seat to be upwardly and downwardly foldable about a horizontal axis and to couple the adjusting device functionally to this folding function of the seat. The seat can fold back to the rear. Embodiments are also possible in which the seat will pivot towards the armrest or towards the side opposite of the armrest. The relevant feature of this coupling is that the position of the armrest is controlled simultaneously by the position of the foldable seat. The seat is preferably subject to a spring force in this embodiment in the manner that it is pivoted upwardly to the upwardly folded position when no operator sits on the seat and presses the same with his weight to the downwardly folded position. Such a spring loading for example will automatically trigger a pivoting of the armrest from the sitting operating position to the standing operating position as a result of the operator standing up (through which the seat will pivot upwardly as a result of the spring loading). This embodiment with coupling of the armrest position to the folded position of the seat is especially advantageous in cases where the adjusting device is arranged in the manner that the armrest is adjustable merely in the vertical direction, optionally combined with a lateral adjusting movement. The upward folding of the seat with the upward adjustment (and optionally lateral adjustment) of the armrest leads to the consequence that the space beneath the seat can be used as a standing area by the operator in the standing operating position of the armrest. This embodiment is especially characterized by its especially low need of space.

The specific arrangement of the adjusting device can be varied in many ways. Hydraulic, pneumatic and/or a electromotive devices can be provided for example in order to control the adjusting movement of the armrest from the sitting operating position to the standing operating position and vice versa. Respectively suitable guide rails, telescopic elements, etc can be used for this purpose for example. It is preferable that the adjusting device has a pivot gear which is arranged for performing a pivoting movement of the armrest that is disposed in a vertical plane. Pivot gears can be realized in a comparatively cost-effective way and show highly functional reliability. One relevant feature of the pivot gear in accordance with the invention is that it is arranged for performing a pivoting movement of the armrest which is disposed in a vertical plane. Said vertical plane preferably extends in the direction of view of the operator or in the working direction of the construction machine. This includes both adjusting movements which are oriented merely in a vertical direction and such adjusting movements which in addition to a vertical component also comprise a horizontal component. Such pivot gears are preferable whose pivot members move beyond the pivoting movement in pivot planes which are parallel with respect to each other and are partly identical.

A large number of different pivot gears can be considered in accordance with the invention for realizing the adjusting device. The use of a planar gear has proven to be especially favorable for reasons of limited space.

A concrete type of gear which is especially preferred for obtaining the pivot gear in accordance with the invention is the four-link gear. It is usually characterized by the presence of four gear members, e.g. arranged in the form of a quadrangle with respect to one another, with adjacent gear members each being connected with each other via a link joint. It is ideal when all pivot axes of the respectively connected gear members are disposed parallel with respect to each other.

The four-link gear is preferably arranged as a link mechanism, especially as a parallel link mechanism. Link mechanisms are especially suitable for the parallel guidance of individual members. It is especially economical when a link member of a pivot gear is formed by a support element of the armrest. It is thus possible in an expression of the favorable manner to maintain the horizontal positioning of the armrest or the supporting surface of the armrest in an especially efficient manner over the entire pivoting movement, which horizontal positioning is preferable in order to ensure an ergonomically favorable position of the armrest/supporting surface of the armrest. Moreover, the configuration of the adjusting device or the pivot gear of the adjusting device can be simplified because the armrest fulfils the dual function of "gear member" and "armrest".

It is alternatively or additionally also possible that a key member is formed by the seat frame or a part rigidly connected with the seat frame or the seat or a part which is stationary relative to the floor of the operator workplace. This area then fulfils the dual function of "gear member" and "gear frame".

The extent of the adjusting movement of the armrest is usually limited between sitting operating position and its standing operating position via the adjusting device, e.g. by respective limit stops etc. Principally, such embodiments are provided at first in accordance with the invention which allow the sole adjustment of the armrest between its two end positions of sitting operating position and standing operating position. Intermediate positions between the two outermost pivot-limited stop positions are not possible in these embodiments. It is preferable however to provide a locking apparatus in the adjusting device in the manner that the armrest can be fixed in the sitting position and/or in the standing position. This embodiment comes with the advantage that the armrest can also be locked in intermediate positions between its maximally limited sitting operating position and maximally outwardly pivoted standing operating position, e.g. in a sitting/standing operating position. In this way it is possible to consider differences in height of the individual operators in an especially good way. The adjusting device can comprise respectively suitable latching means and/or clamping means for specific locking.

In order to reduce the application of force required for adjusting the armrest, the adjusting device preferably comprises a drive apparatus. It is configured in a manner that it provides a drive force which, depending on the specific embodiment, drives or at least supports an adjustment of the armrest from the sitting operating position to the standing operating position and/or vice versa. For this purpose, the adjusting device may comprise a respective cylinder/piston unit or an electromotive unit as a drive apparatus. The use of a gas-operated compression spring is especially advantageous which is characterized by its force which is virtually independent of the spring deflection, its low need for space and its outstanding damping properties. The pressurization of the seat by means of a spring force as mentioned above can be used as a drive apparatus in the case of a respective coupling of the armrest to the seat.

It is especially economical when the drive apparatus is arranged in the manner that it is arranged simultaneously for locking the armrest in the standing position and/or in the sitting position in addition to the (at least partial) drive of the adjusting movement of the armrests from their sitting operating position to their standing operating position and/or vice versa. Such a drive apparatus thus fulfils a double function and combines drive properties and fixing as well as locking properties.

The drive apparatus is ideally further integrated in the operator workplace in the manner that it is linked directly to the pivot gear. This helps avoid respective transmission elements for transmitting and forwarding the drive power, thus simplifying the configuration of the operator workplace in accordance with the invention.

In accordance with the description as provided above, the fundamental concept of the invention is to enable the reciprocating movement of the armrest between a sitting operating position and a standing operating position. In order to achieve a fine adjustment especially of the armrest or the position of the adjusting device in the sitting operating position and the standing operating position, the operator workplace or the adjusting device is preferably arranged in the manner that the precise positioning of the sitting operating position and the standing operating position is adjustable. Adjustable shall mean in the present case that the positioning of the armrest can be adjusted by the operator by respectively suitable adjusting devices such as actuating motors, adjusting screws, etc in an adjusting or fine adjustment range which oscillates about the respective end position of the adjusting movement of the armrest. These adjustments relate to different positions of the armrest in the respective sitting operating position and the standing operating position. With respect to the adjustability of the armrest in the vertical direction, this adjusting range is configured in the manner for example that it preferably comprises 3 to 10% of the maximum vertical adjustment path of the armrest from the sitting operating position to the standing operating position. This usually concerns a few centimeters, e.g. in the range of 4 to 10 cm.

Further possibilities for variation concerning the operator workplace in accordance with the invention are obtained with respect to the manner of controlling the adjustment of the armrest or the adjusting device between its sitting operating position and its standing operating position and vice versa. It is principally possible to construct the adjusting device of the armrest in a virtually floating manner, so that the adjustment is triggered by merely pressing or pulling the armrest between its two end positions. It is advantageous however concerning operating comfort and increased operating security to secure the armrest in its respective position against further adjustments. In order to trigger an adjustment of armrest from the sitting operating position to its standing operating position and vice versa, the operator workplace comprises a triggering element in this embodiment, e.g. in the form of a triggering lever or a triggering button, the actuation of which triggers the adjustment between the sitting operating position in the standing operating position and vice versa. The triggering element is further preferably arranged at a position that is easy to reach, e.g. in the visual area of the armrest in the direction of view of the operator, in order to ensure good accessibility both in the sitting operating position and also in the standing operating position.

It is further advantageous with respect to production to arrange the operator workplace including the seat, the adjusting unit and the armrest as a modular unit. The operator workplace can then be fabricated nearly completely in addition to the remainder of the machine and can be inserted as a coherent module into the remainder of the machine. It has been noticed that it is advantageous especially in the field of road milling machines to arrange the operator workplace in a manner that is isolated against oscillations relative to the machine compartment of the road milling machine in order to decouple the usually strong vibrations of the machine frame relative to the operator workplace. In addition or alternatively, the operator workplace can be arranged to be pivotable around a vertical axis in order to provide the operator various positioning possibilities to the right and to the left.

It is further possible to provide on both sides of the seat one armrest each in an operator workplace in accordance with the invention in the manner as described above. In this way the operator is enabled to place both arms on an armrest in accordance with the invention in the sitting and in the standing position. At the same time or alternatively, it is also possible to provide a steering column which is adjustable in height and inclination and which ideally changes its position together with the armrest from a positioning adjusted to the sitting operating position and a positioning adjusted to the standing operating position.

A further aspect of the invention is a construction machine, especially a milling machine for processing the road surface, comprising an operator workplace in accordance with the invention.

The operator workplace is ideally arranged in a vibration-dampened manner relative to the machine frame of the construction machine in order to minimize the vibration load transmitted onto the operator. In this embodiment, the operator workplace preferably further comprises a floor of a driver's cab which is also vibration-dampened and is pivotably arranged around a vertical axis together with the seat, depending on the embodiment. The pivoting movement of the seat obviously occurs together with the armrest in order to keep the relative positioning between the operator and the armrest in a constant way.

BRIEF DESCRIPTION OF THE DRAWINGS

The invention is now explained in closer detail by reference to exemplary embodiments shown in the schematic drawings, wherein.

The same parts are provided with the same reference numerals in the drawings.

DETAILED DESCRIPTION OF THE INVENTION

Figure 1:
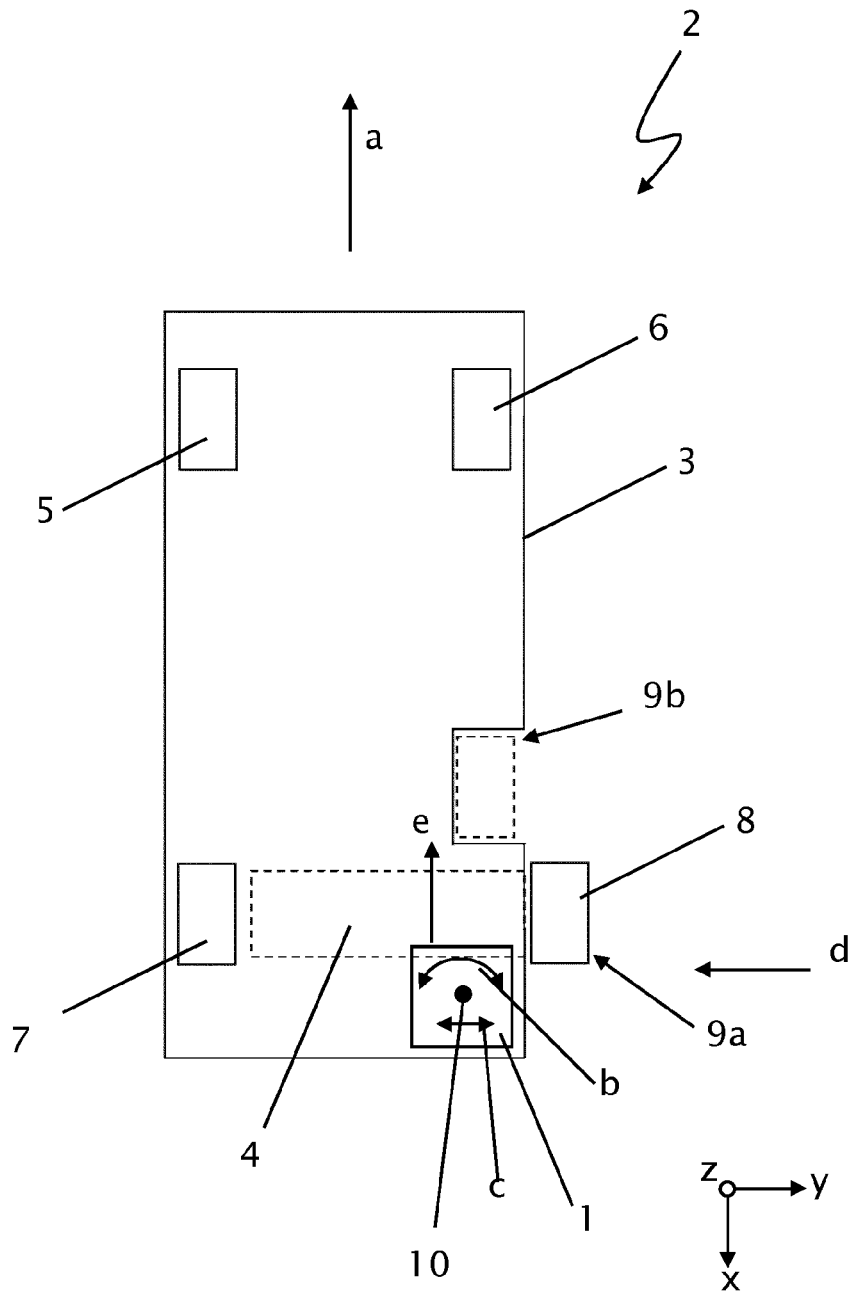
FIG. 1 shows a top view of a milling machine with an operator workplace.

FIG. 1 shows the typical positioning of an operator workplace 1 of a milling machine 2 for processing a road surface in relation to the machine frame 3 and a work device 4. The operator workplace 1, which is shown in FIG. 1 in a merely highly schematic way, is arranged in the rear part of milling machine 2 and lies above the work device 4, relating to the direction of work "a". The milling machine 2 further comprises two front support wheels 5 and 6 and two back support wheels 7 and 8 which are each driven by means of a respective hydraulic motor and carry the machine frame 3. Embodiments are also alternatively possible in which only one front support wheel is provided. The work device 4, which is concretely arranged as a cylindrical milling drum, is virtually flush on the one side (the right side in FIG. 1) with the machine frame 3. This side of the milling machine 2 is also known as the null side. The work device 4 is used for example for removing road surfaces made of concrete, asphalt or the like, and is lowered onto the surface to be processed, made to rotate and is moved over the road surface in the direction of arrow "a". Direction of arrow "a" thus indicates in FIG. 1 the "forward direction" or the "working direction" of the milling machine 2. The working direction corresponds to the direction of view "e" of the operator of milling machine 2 in the operator workplace 1. The rear support wheel 8 disposed on the null side is further pivotably arranged and can be pivoted from an outwardly pivoted position 9a to an inwardly pivoted position 9b which is virtually flush with the machine frame. The rear support wheel 8 is linked for this purpose to the machine frame 3 via a suitable horizontal pivot gear (not shown in FIG. 1).

Means which are not shown in closer detail are further provided in the present embodiment of the operator workplace 1, which means ensure a horizontal pivotability according to double arrow "b" around a vertical axis on the one hand and a vertical displaceability to the left and right according to arrow "c" of the operator workplace 1. In the embodiment of the operator workplace 1 in FIG. 1, it is further mounted in a vibration-dampened way in relation to the machine frame 3, so that the vibrations occurring especially in the machine frame 3 during the milling work are transmitted in a dampened manner to the operator workplace 1. Further details concerning the configuration and the function of the operator workplace 1 are shown in FIGS. 2 to 7, with the drawings showing the operator workplace 1 from the direction of view "d" in FIG. 1.

Principal elements of the operator workplace 1 are a seat 11 with a seating surface 12 and a backrest 13. The seat 11 further comprises an armrest 14 on the side of the seating surface 12. The armrest 14 is provided for supporting the arm, especially the forearm, of the machine operator or user, as shown by the arm 15 indicated in a phantom-like manner in FIGS. 2 and 3. The armrest 14 comprises an arm supporting surface 16 for this purpose, which in the illustrated embodiment is provided especially for accommodating the elbow region of the arm. The armrest 14 further comprises a joystick control element 17 and further manual operating elements 18 and 19. Respective machine functions such as forward and rear drive, milling operation on/off, lifting of the side shields, etc can be controlled via the actuation of the control elements 17, 18 and 19. The control elements 17, 18 and 19 form an operating console together with the arm supporting surface 16, which console will also be known as the upper functional part 20 of the armrest 14.

Figure 2:
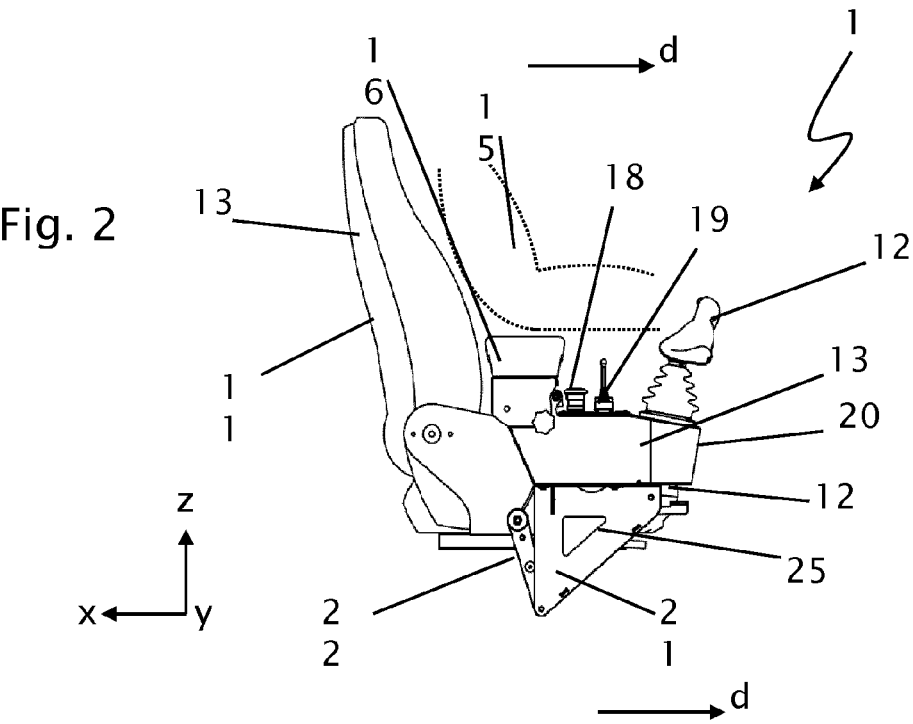
FIG. 2 shows a side view of an operator workplace with an armrest disposed in the sitting operating position.
Figure 3:
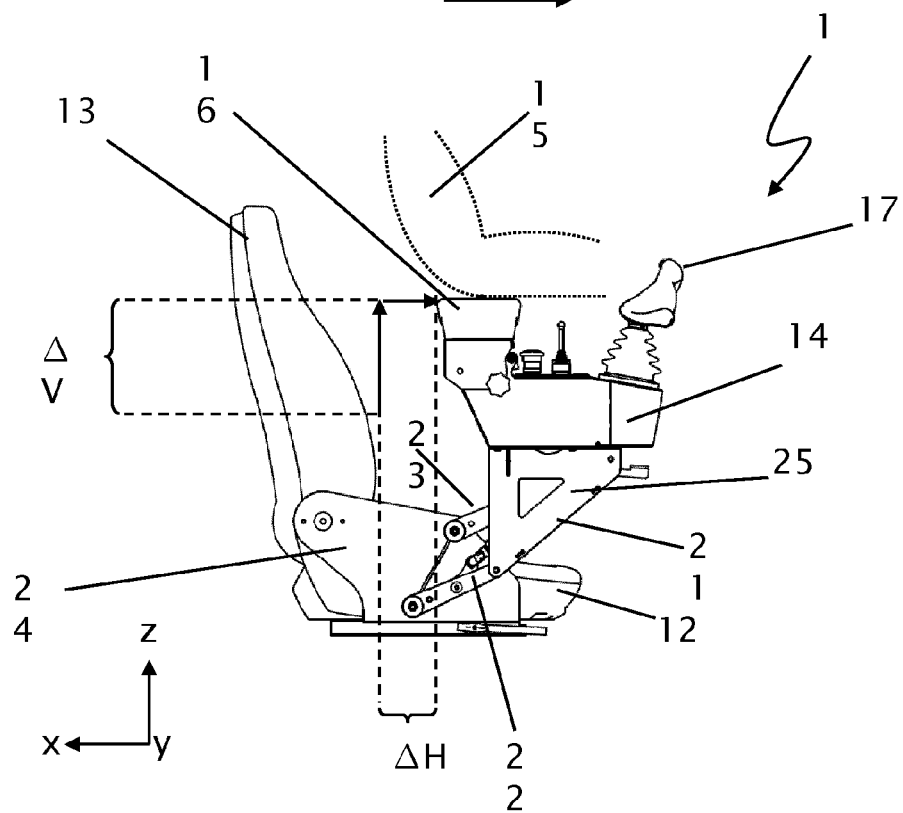
FIG. 3 shows a side view of the operator workplace of FIG. 2 with the armrest in the standing operating position.

The armrest 14 is arranged with substantially two components and comprises an upper functional part 20 and a bottom mounting part 21. The arm supporting surface 16 and the control elements 17 to 19 are arranged in the functional part 20. The bottom mounting part 21 is used substantially for holding the upper functional part 20 and for the connection to seat 11. The connection to seat 11 occurs via two pivoting levers 22 and 23 which are linked at their one end to the bottom mounting part 21 of armrest 14 and at their other end to a frame element 24 of the seat 11. The frame element 24, the two pivoting levers 22 and 23 and the plate-like bottom mounting part 21 of the armrest 14 are jointly part of an adjusting device which enables an adjustment of the armrest 14 between the two positions as shown in FIGS. 2 and 3 for example. FIG. 2 (and also FIGS. 4 and 6) show the "sitting operating position", in which the armrest 14 is positioned towards the seat 11, so that the operator is able from a seated position to place his right arm or elbow on the arm supporting surface 16 and is able to control the control elements 17, 18 and 19 conveniently with the right hand. FIG. 3 (and FIGS. 5 and 7) show the "standing operating position", in which the armrest 14 is placed upwardly with respect to seat 11 in the vertical direction (z direction) and is offset forwardly in the horizontal direction (x direction). This is further illustrated in FIG. 3 by the differential information ΔV (corresponds to the vertical adjustment of the armrest 14 in the standing operating position as compared to the sitting operating position of FIG. 2) and ΔH (corresponds to the offset of the armrest 14 in the horizontal direction as compared with the sitting operating position in FIG. 2). In the embodiment of the operator workplace 1 as shown in FIGS. 2 to 7, the adjusting device is thus arranged in the manner that the armrest 14 is adjustable between the sitting operating position and the standing operating position which is pivoted forwardly in the horizontal direction and upwardly in the vertical direction.

Figure 4:
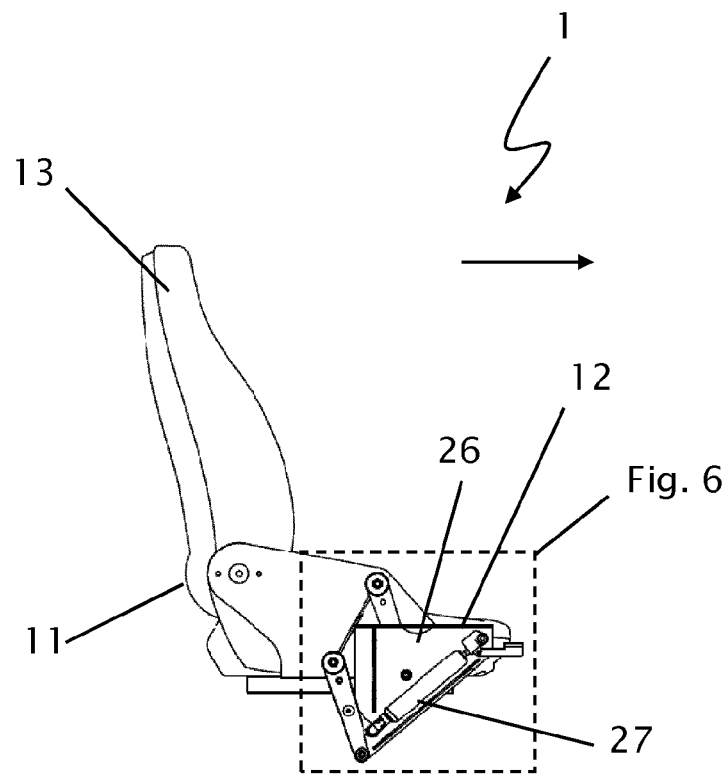
FIG. 4 shows a side view of the operator workplace FIG. 2 with removed superstructure.

The principal functionality of the adjustment device of FIGS. 2 and 3 is explained in further detail in FIGS. 4 to 7. As compared with FIGS. 2 and 3, the upper functional part 20 of armrest 14 was dismounted in FIGS. 4 and 5, so that only the bottom mounting part 21 is shown of the armrest 14 itself. FIG. 4 corresponds to the sitting operating position of FIG. 2, and FIG. 5 to the standing operating position of FIG. 3. The front plate 25 was further removed from the bottom mounting part 21, so that the rear plate 26 is exposed. The front plate 25 and the rear plate 26 are arranged parallel with respect to each other in the installed state and enclose a cavity between themselves in which a gas-operated compression spring 27 is arranged. The function of the gas-operated compression spring 27 will be explained below in closer detail.

Figure 5:
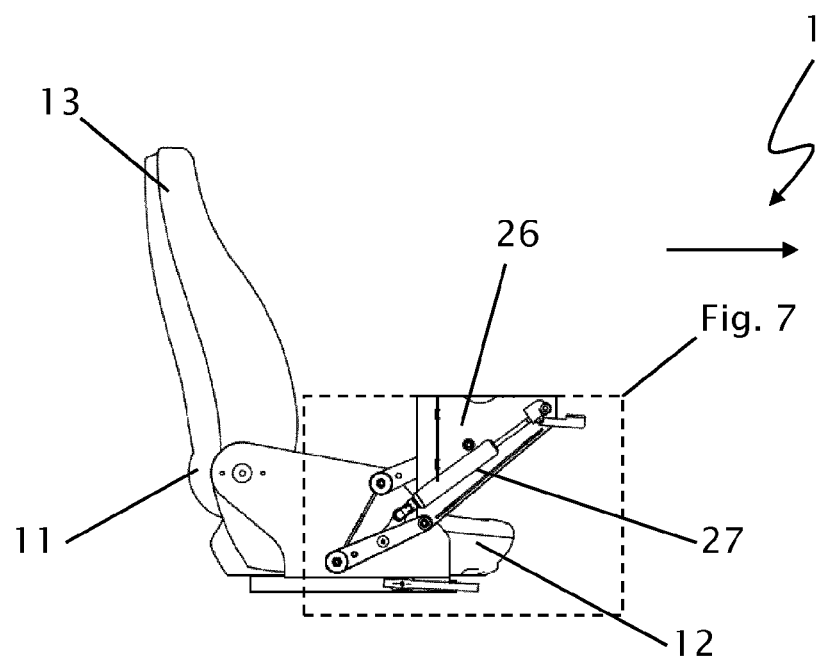
FIG. 5 shows a view of the operator workplace of FIG. 3 with removed superstructure.
Figure 6:
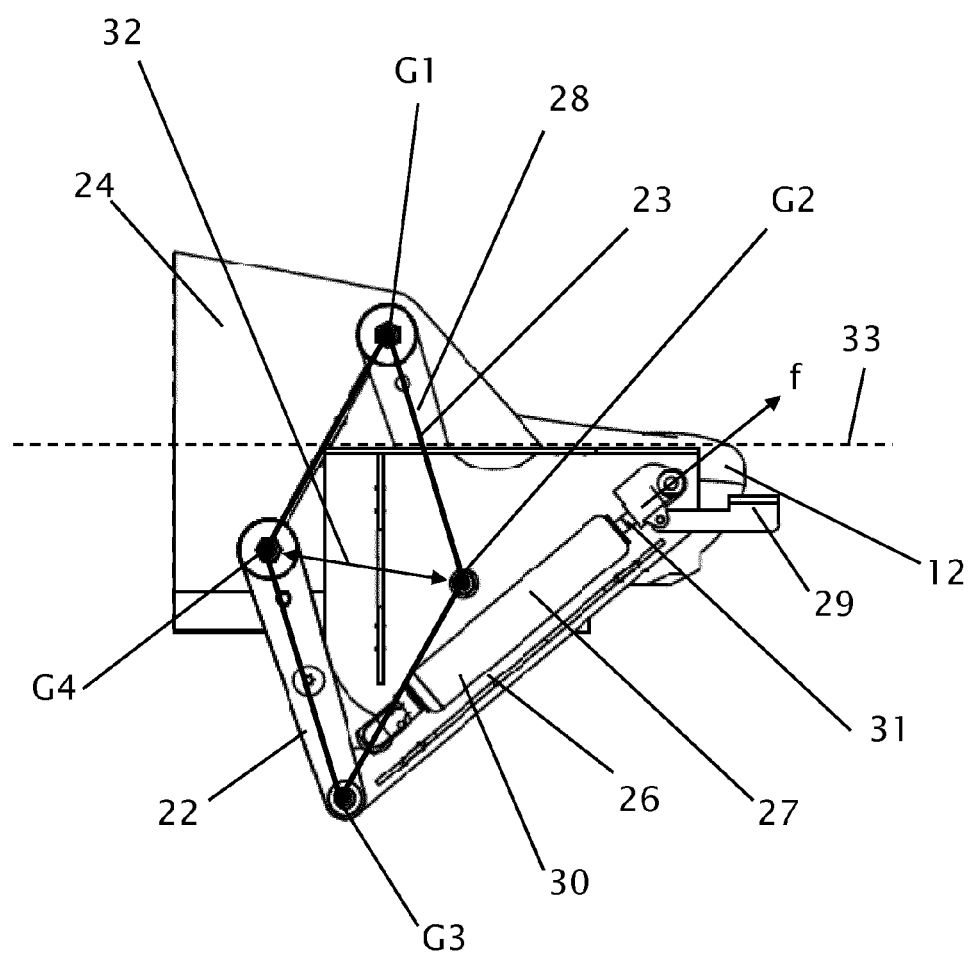
FIG. 6 shows a diagram of the pivot gear according to FIGS. 2 and 4.
Figure 7:
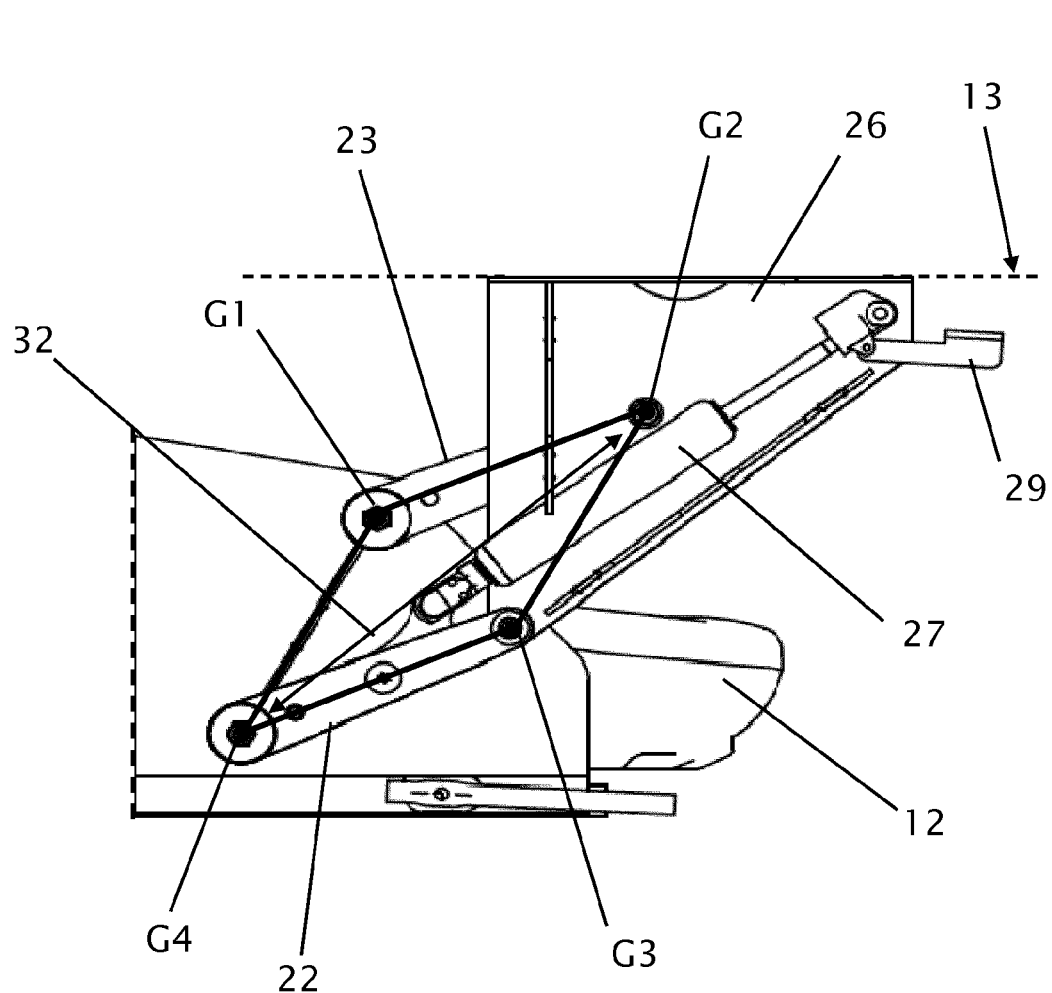
FIG. 7 shows a diagram of the pivot gear in the position according to FIGS. 3 and 5.

The areas framed in FIGS. 4 and 5 with the broken lines are shown in FIGS. 6 and 7 in an enlarged view. FIG. 6 is thus an enlarged view of a detail of FIG. 5 and also shows the sitting operating position, whereas FIG. 7 shows an enlarged view of FIG. 9 and shows the standing operating position of armrest 14 (without the upper functional part 20 and without the front plate 25).

FIGS. 6 and 7 show that the adjusting device comprises a pivot gear in the form of a four-link gear as a relevant component, the four link points of which are shown in FIGS. 6 and 7 with G1, G2, G3 and G4. The frame of the four-link is formed by the frame element 24 of the seat, on which the two pivoting levers 22 and 23 extend in parallel with respect to each other and are pivotably arranged via the link joints G1 and G4 in a vertical plane (specifically in the x/y plane). In their opposing areas however the two pivoting levers 22 and 23 are connected on the bottom mounting part 21 (especially the rear plate 26) via the joints G2 and G3 in the vertical x/z plane. This leads to a joint parallelogram 28 which is shown schematically in FIGS. 6 and 7 for further illustration. The two pivoting levers 22 and 23 further act as pull rods of the link mechanism obtained by the four-link gear. It is thus achieved that the horizontal alignment of the upper support surface in the bottom mounting part 21, on which the upper functional part 20 with the arm supporting surface 16 is mounted, remains horizontally aligned over the entire pivoting process between the sitting operating position and the standing operating position and is also horizontally aligned in the two end positions.

A triggering lever 29 is further provided which is used for controlling the gas-operated compression spring 27. The gas-operated compression spring is attached between the pivoting lever 22 and the rear plate 26 which is arranged adjacent thereto, and it is used for fixing and adjusting the armrest 14 from the sitting operating position to the standing operating position and vice versa. Relevant elements of the gas-operated compression spring are a cylinder 30 and a piston 31 which is held in a longitudinally displaceable manner in the cylinder and which is adjustable along the cylinder axis. When the gas-operated compression spring 27 is actuated in its compressed position as shown in FIG. 6 via the triggering lever 29, it develops an actuating force in the direction of arrow "f". As a result, the two members of the pivoting lever 22 and rear plate 26 as well as the link points G4 and G2 are pressed apart, as is indicated by the double arrow 32. The force introduced by the gas-operated compression spring is converted into a pivoting movement of the four-link gear which is disposed obliquely to the front or in the direction of view d or in the x/z plane by fixing the gear member between the link points G1 and G4 as a frame.

A further actuation of the triggering lever 29 is necessary for returning the armrest 14 from its standing operating position to the sitting operating position, by means of which the fixing of the gas-operated compression spring 27 is released and it can be brought back to the compressed state again according to FIG. 6, e.g. by means of application of manual force, and thus limits the armrest 14 again in its sitting operating position.

It is a further function of the gas-operated compression spring that the positioning of the four-link joint will be locked when the triggering lever 29 is not actuated and an inadvertent adjustment of the four-link joint is thus prevented for example. A special advantage of the gas-operated compression spring is that a drive function and a locking function can be achieved with it simultaneously.

While the present invention has been illustrated by description of various embodiments and while those embodiments have been described in considerable detail, it is not the intention of applicant to restrict or in any way limit the scope of the appended claims to such details. Additional advantages and modifications will readily appear to those skilled in the art.

The invention in its broader aspects is therefore not limited to the specific details and illustrative examples shown and described. Accordingly, departures may be made from such details without departing from the spirit or scope of applicants' invention.

What is claimed is:

1. An operator workplace of a construction machine, comprising:
    a seat with a seating surface;
    an armrest arranged to the side of the seating surface and having an arm supporting surface configured to support an operator's arm; and
    at least one control element arranged on the armrest for controlling at least one machine function,
    wherein an adjusting device is provided which is arranged in a manner that the armrest is adjustable between a sitting operating position and a standing operating position which in comparison with the sitting operating position is positioned upwardly in the vertical direction, the armrest and the arm supporting surface being arranged such that a position of the operator's arm relative to the arm supporting surface, and also relative to the at least one control element, is maintained as the armrest is adjusted between the sitting operating position and the standing operating position, and
    wherein the adjusting device is arranged in a manner that in the standing operating position the armrest is automatically forwardly offset in the horizontal direction in relation to the seating surface relative to the sitting operating position.

2. An operator workplace according to claim 1, wherein the adjusting device is arranged in a manner that the adjusting movement of the armrest between the sitting operating position and the standing operating position occurs simultaneously with respect to the height and in the horizontal direction.

3. An operator workplace according to claim 1, wherein the adjusting device is arranged in a manner that the armrest is laterally adjustable.

4. An operator workplace according to claim 1, wherein the seating surface is arranged to be upwardly foldable about a horizontal axis and that the adjusting device is functionally coupled with the folding function of the seating surface in a manner that the armrest will pivot from the standing operating position to the sitting operating position following the downward folding into the seating surface.

5. An operator workplace according to claim 1, wherein the adjusting device comprises a pivot gear which is arranged for performing a pivoting movement of the armrest, which movement is disposed in a vertical plane.

6. An operator workplace according to claim 5, wherein the pivot gear is a four-link gear.

7. An operator workplace according to claim 5, wherein the pivot gear is a link mechanism, especially a parallel link mechanism.

8. An operator workplace according to claim 5, wherein a gear member of the pivot gear is formed by a support element of the armrest.

9. An operator workplace according to claim 1, wherein the adjusting device comprises an arresting apparatus which is arranged in a manner that the armrest can be locked in the sitting operating position and/or standing operating position.

10. An operator workplace according to claim 1, wherein the adjusting device comprises a drive apparatus.

11. An operator workplace according to claim 7, wherein the drive apparatus comprises a cylinder/piston unit, especially a gas-operated compression spring.

12. An operator workplace according to claim 10, wherein the drive apparatus is simultaneously arranged for locking the armrest in the standing operating position and/or sitting operating position.

13. An operator workplace according to claim 10, wherein the drive apparatus is linked directly to the pivot gear.

14. An operator workplace according to claim 1, wherein the adjusting device is arranged in a manner that the positioning of the sitting operating position and/or standing operating position is adjustable.

15. An operator workplace according to claim 1, wherein a triggering lever is arranged on the armrest, the actuation of which triggers the adjustment between the sitting operating position and the standing operating position and vice versa.

16. A construction machine, comprising:
    an operator workplace according to claim 1.

17. A construction machine according to claim 16, wherein the operator workplace is arranged to be vibration-dampened in relation to a machine frame of the construction machine.

18. A construction machine according to claim 16, wherein the operator workplace is arranged in a manner that the seat is pivotable about a vertical axis together with the armrest.

19. A construction machine according to claim 16, wherein the construction machine comprises a milling machine for processing a road surface.

* * * * *